(12) United States Patent
Craig et al.

(10) Patent No.: US 8,602,698 B2
(45) Date of Patent: Dec. 10, 2013

(54) COMBINATION END MILLING/DRILLING/REAMING CUTTING TOOL

(75) Inventors: Karen Anne Craig, Greensburg, PA (US); Jason George Chandler, Asheboro, NC (US)

(73) Assignee: Kennametal Inc., Latrobe, PA (US)

( * ) Notice: Subject to any disclaimer, the term of this patent is extended or adjusted under 35 U.S.C. 154(b) by 768 days.

(21) Appl. No.: 12/868,106

(22) Filed: Aug. 25, 2010

(65) Prior Publication Data
US 2012/0051863 A1    Mar. 1, 2012

(51) Int. Cl.
*B23B 51/08*    (2006.01)

(52) U.S. Cl.
USPC .............. 409/132; 409/200; 408/1 R; 408/22; 408/25; 7/169

(58) Field of Classification Search
USPC ................ 409/132, 200; 408/22, 24, 25, 224; 7/169
IPC ........................................................ B32B 51/08
See application file for complete search history.

(56) References Cited

U.S. PATENT DOCUMENTS

| | | | | |
|---|---|---|---|---|
| 1,701,427 A * | 2/1929 | Shields | .......................... | 175/391 |
| 3,346,894 A * | 10/1967 | Lemelson | ........................ | 408/12 |
| 3,667,857 A * | 6/1972 | Shaner et al. | ................. | 408/230 |
| 3,739,682 A * | 6/1973 | Siebol et al. | ................ | 411/387.2 |
| 4,274,771 A | 6/1981 | Nishimura | | |
| 4,796,709 A * | 1/1989 | Lynde et al. | ................. | 166/55.6 |
| 4,854,786 A * | 8/1989 | Alexander et al. | ............ | 408/1 R |
| 5,282,705 A * | 2/1994 | Shiga et al. | ................... | 408/211 |
| 6,007,281 A | 12/1999 | Eriksson et al. | | |
| 6,200,078 B1 * | 3/2001 | Kubota | ........................... | 409/74 |
| 6,511,265 B1 * | 1/2003 | Keller et al. | ..................... | 407/53 |
| 6,773,211 B2 | 8/2004 | Zackrisson et al. | | |
| 7,097,395 B2 * | 8/2006 | Horiuchi et al. | ............. | 408/1 R |
| 7,226,250 B2 * | 6/2007 | Gatton et al. | ................. | 408/1 R |
| 7,431,538 B1 | 10/2008 | Ni et al. | | |
| 7,770,276 B2 * | 8/2010 | Christ et al. | ................. | 29/90.01 |
| 2001/0047219 A1 * | 11/2001 | Oden | ........................... | 700/159 |
| 2002/0102144 A1 | 8/2002 | Linderholm et al. | | |
| 2003/0102139 A1 | 6/2003 | Debat et al. | | |
| 2005/0019115 A1 * | 1/2005 | Gatton et al. | ................... | 408/30 |
| 2006/0120814 A1 * | 6/2006 | Lipohar et al. | ............... | 408/181 |
| 2006/0165500 A1 | 7/2006 | Linderholm | | |
| 2008/0193234 A1 * | 8/2008 | Davancens et al. | .......... | 408/1 R |
| 2008/0253846 A1 | 10/2008 | Ni et al. | | |
| 2008/0267728 A1 | 10/2008 | Eriksson et al. | | |
| 2010/0158626 A1 | 6/2010 | Nakahata et al. | | |
| 2011/0268516 A1 * | 11/2011 | Short | .............................. | 408/17 |
| 2012/0082523 A1 * | 4/2012 | Bozkurt | ......................... | 408/59 |
| 2012/0219371 A1 * | 8/2012 | Craig | ............................ | 408/1 R |

FOREIGN PATENT DOCUMENTS

| | | | | |
|---|---|---|---|---|
| DE | 3516724 A1 * | 10/1985 | ............. | B32B 51/08 |
| DE | 4010075 A1 * | 10/1991 | ............. | B23B 51/08 |
| JP | 58056719 A * | 4/1983 | ............. | B32B 51/08 |

(Continued)

*Primary Examiner* — Eric A Gates
(74) *Attorney, Agent, or Firm* — Larry R. Meenan, Esq.

(57) ABSTRACT

A combination end milling/drilling/reaming cutting tool includes an end milling portion, a drilling portion, and a reaming portion. The cutting tool also includes a neck portion between the end milling portion and the drilling portion, and a clearance neck portion between a shank and the reaming portion. A method of machining a workpiece using the combination end milling/drilling/reaming cutting tool is also disclosed.

12 Claims, 5 Drawing Sheets

(56) References Cited

FOREIGN PATENT DOCUMENTS

| JP | 06198511 | A | * | 7/1994 | ............ B32B 51/08 |
| JP | 2005-120984 | A | | 5/2005 | |
| JP | 2006102870 | A | * | 4/2006 | |
| WO | 2009/005446 | A1 | | 1/2009 | |

* cited by examiner

COMBINATION END MILLING/DRILLING/REAMING CUTTING TOOL

BACKGROUND OF THE INVENTION

Fiber reinforced plastic (FRP) materials are widely used in aerospace industry due to its high specific strength and high specific stiffness. FRP materials are composite materials consisting of soft resin matrix and high strength fiber reinforcement. Typical fiber reinforcements include carbon fibers (CFRP), glass fibers (GFRP), Kevlar fibers, and the like. FRP materials are often processed into a laminated structure. FRP materials have excellent in-plane strength, but low inter-laminar strength.

Conventional drilling also known as "push drilling" is a common practice used with metals. The drill is pressed downward along the axis of the tool to create a hole. Drilling with this method reduces side to side deflection in the metal layers. However, push drilling CFRP materials is typically problematic and fiber delamination and other damage is an issue.

One approach to reduce the fiber delamination is to use an orbital drilling process. Orbital drilling is a hole making operation by milling in which the center of an end mill orbits about the center of the intended hole while spinning on its own axis and moving in the axial direction. Orbital drilling is also called "circular milling" or "helical interpolation."

By orbital drilling CFRP materials, the hole is helically interpolated. This cuts the hole with a smaller diameter tool that is offset from the center, therefore milling the hole to diameter. This method produces holes with clean edges and minimal defects.

However, push drilling holes has a shorter cycle time than orbital drilling holes using a helical interpolation process. These tools are sized to the diameter of the hole to be made and are more rigid than smaller diameter orbital cutters for the same finished hole size.

In aircraft metal materials, particularly aluminum, it has been found when holes that are conventionally push drilled and reamed, the holes have a greater fatigue life than fully orbital drilled holes using helical interpolation. This is due to residual stress being left in the hole from conventional push drilling and reaming operations. In other words, orbital drilling creates less residual stress in the workpiece.

SUMMARY OF THE INVENTION

Multi-function end effectors and computer numerically-controlled (CNC) machines produce orbitally drilled holes and push drilled holes with separate tools. The problem of fiber delamination CFRP materials and increasing fatigue life in metal materials is solved by combining end milling using helical interpolation, push drilling, and reaming cutting operations into a combination end milling/drilling/reaming cutting tool. The combination cutting tool provides the synergistic effect of faster cycle times and ease of operation, as compared to separately using these three cutting operations.

In one aspect, a combination end milling/drilling/reaming cutting tool comprises an end milling portion; a reaming portion; and a drilling portion between the end milling portion and the reaming portion.

In another aspect, a combination end milling/drilling/reaming cutting tool comprises an end milling portion; a drilling portion; a reaming portion; a neck portion between the end milling portion and the drilling portion; a shank; and a clearance neck portion between the reaming portion and the shank. The end milling portion has a first diameter. The neck portion has a second diameter smaller than the first diameter. The drilling portion has a third diameter that is larger than both the first and second diameters. The reaming portion has a fourth diameter that is larger than the first, second and third diameters. The clearance neck portion has a fifth diameter that is smaller than the third and fourth diameters and larger than the first and second diameters.

In another aspect, a method of machining a workpiece using a combination end milling/drilling/reaming cutting tool including an end milling portion, a drilling portion, and a reaming portion comprises: positioning the cutting tool with respect to the workpiece to begin a machining cycle; drilling a hole in a first layer of material with the end milling portion of the cutting tool using an orbital drilling operation; positioning the cutting tool such that a longitudinal axis of the cutting tool is substantially aligned with an axis of the hole; drilling the hole in a second layer of material with the drilling portion of the cutting tool using a push drilling operation; and reaming the hole with the reaming portion of the cutting tool using the push drilling operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIGS. 5(a)-(g) is an isomeric view of a method for machining a workpiece having a top layer of CFRP material and a bottom layer of metal material using the cutting tool of the invention.

DETAILED DESCRIPTION OF THE INVENTION

Below are illustrations and explanations for a version of combination end milling drilling/push drilling cutting tool and a method for machining a workpiece. However, it is noted that combination cutting tool and machining method may be configured to suit the specific application and is not limited only to the example in the illustrations.

Referring to FIGS. 1-4, wherein like reference characters represent like elements, a combination end milling/drilling/reaming cutting tool for performing a machining operation on a workpiece is generally shown at 10. In one embodiment, the workpiece 60 (FIG. 5) is a composite having a top layer of CFRP material and a bottom layer of metal material, such as titanium, and the like. As used herein, "top" refers to the first material to be machined by the cutting tool 10, and "bottom" refers to the second material to be machined by the cutting tool 10 during the machining operation.

In general, the cutting tool 10 has an end milling portion 12 at one end 20 of the cutting tool 10 to drill the layer of CFRP material using helical interpolation and to drill a pilot hole in the metal layer (orbitally or conventionally), a drilling portion 14, and a reaming portion 16. The cutting tool 10 also includes a neck portion 18 between the end milling portion 12 and the drilling portion 14. The purpose of the neck portion 18 is to create space for chip removal and is dimensioned in length to at least the thickness of the layer 62 of CFRP material of the workpiece 60 (FIG. 5).

The cutting tool 10 includes a shank 22 at the other, opposite end 24. The cutting tool 10 also includes a clearance neck portion 26 between the drilling portion 14 and the shank 22. The purpose of the clearance neck portion 26 is to permit clearance of the cutting tool 10 during a machining operation. The clearance neck portion 26 is also where the chips are ejected. The clearance neck portion 26 also provides clearance for cutting with the rear chamfer 56 of the reaming portion 16. The clearance neck portion 26 is dimensioned in length to be greater than the entire thickness of the workpiece 60 (FIG. 5). The cutting tool 10 also includes a central, longitudinal axis 28 that extends the entire length of the cutting tool 10.

In general, the end milling portion 12 has a diameter 30 that is larger than a diameter 32 of the neck portion 18. The drilling portion 14 has a diameter 34 that is slightly smaller than a diameter 36 of reaming portion 16, but larger than the diameter 30 of the end milling portion 12 and the diameter 32 of the neck portion 18. The diameter 36 of the reaming portion 16 of the cutting tool 10 is substantially equal to the final diameter of the hole 66 (FIG. 5) to be drilled by the cutting tool 10. In addition, the clearance neck portion 26 has a diameter 38 that is smaller than both the drilling portion 14 and the reaming portion 16, but larger than both the end milling portion 12 and the neck portion 18.

In one example of an exemplary embodiment of the cutting tool 10, the end milling portion 12 has a diameter 30 of approximately 0.197 inches (5.00 mm), the neck portion 18 has a diameter 32 of approximately 0.177 inches (4.50 mm), the drilling portion 14 has a diameter 34 of approximately 0.307 inches (7.80 mm), the reaming portion 16 has a diameter 36 of approximately 0.313 inches (7.84 mm), and the clearance neck 26 has a diameter 36 of approximately 0.276 inches (7.00 mm). In this example, the shank 22 has a diameter 38 of approximately 0.384 inches (10.00 mm). It will be appreciated that the invention is not limited by the specific diameter, and that the invention can be practiced with any desirable diameter, depending on the design parameters of the cutting tool 10.

Figure 1:
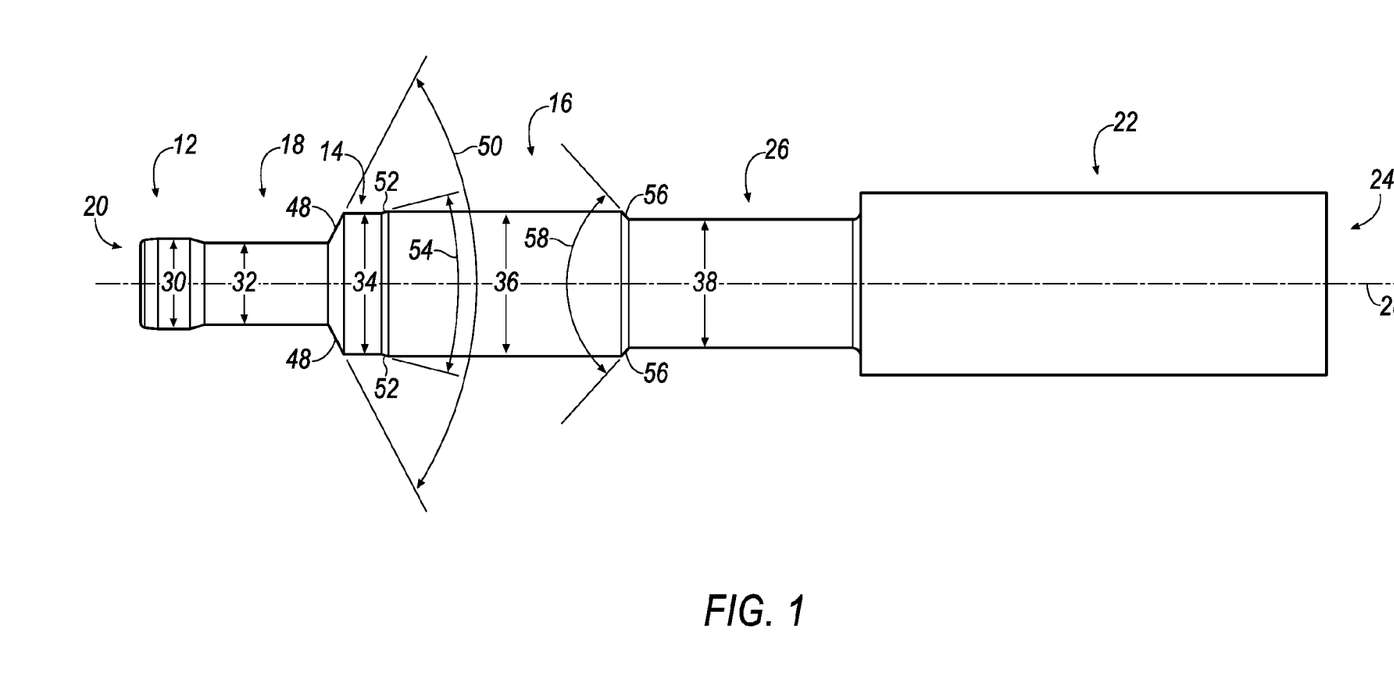
FIG. 1 is a plan view of an exemplary embodiment of a combination end milling/drilling cutting tool of the invention.
Figure 2:
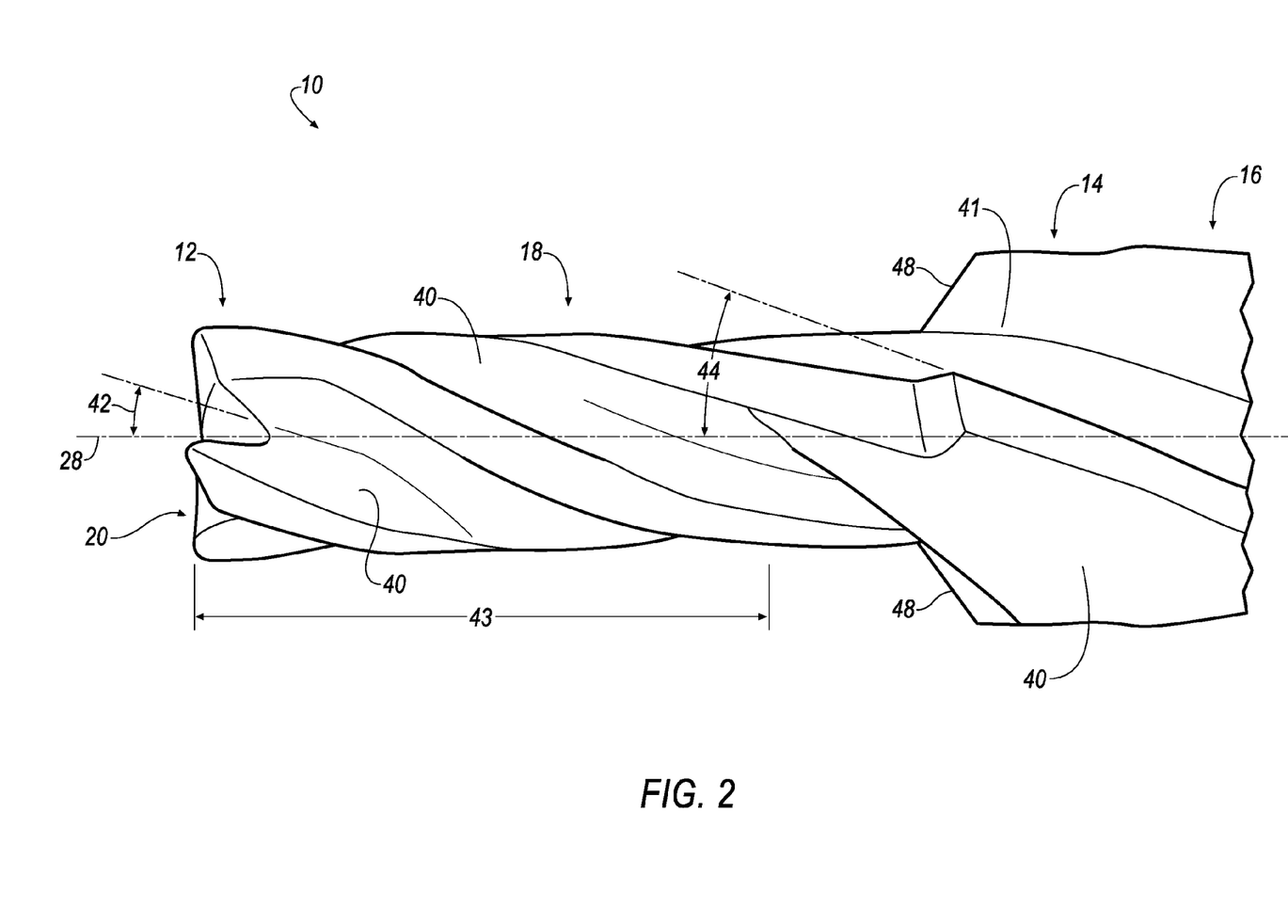
FIG. 2 is an enlarged isometric view of the cutting tool of FIG. 1 showing the end milling portion, the drilling portion, and the front of the reaming portion with an end taper.
Figure 3:
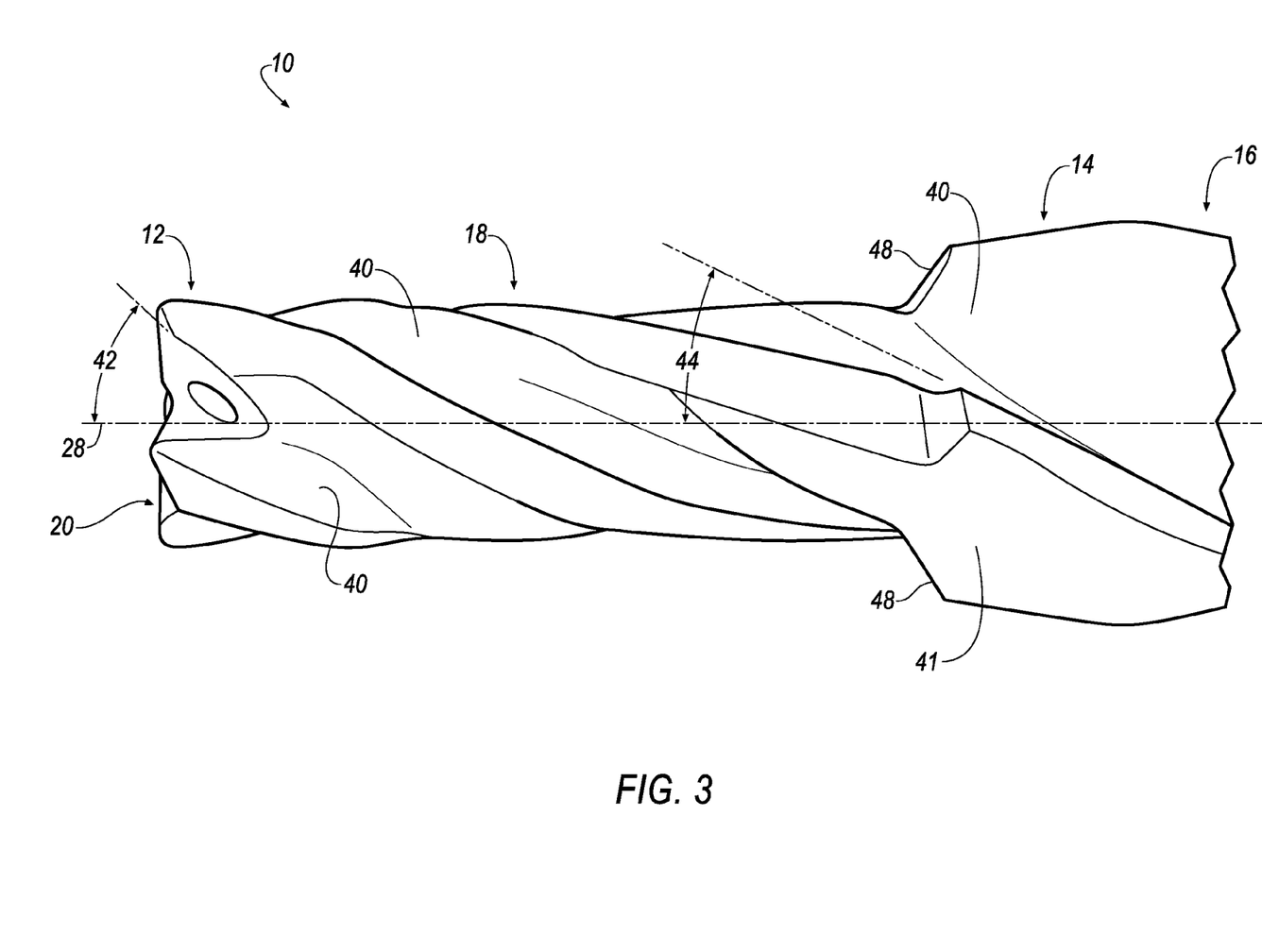
FIG. 3 is another enlarged isometric view of the cutting tool of FIG. 2 rotated ninety (90) degrees showing the non-cutting relief flutes of the drilling portion of the cutting tool.
Figure 4:
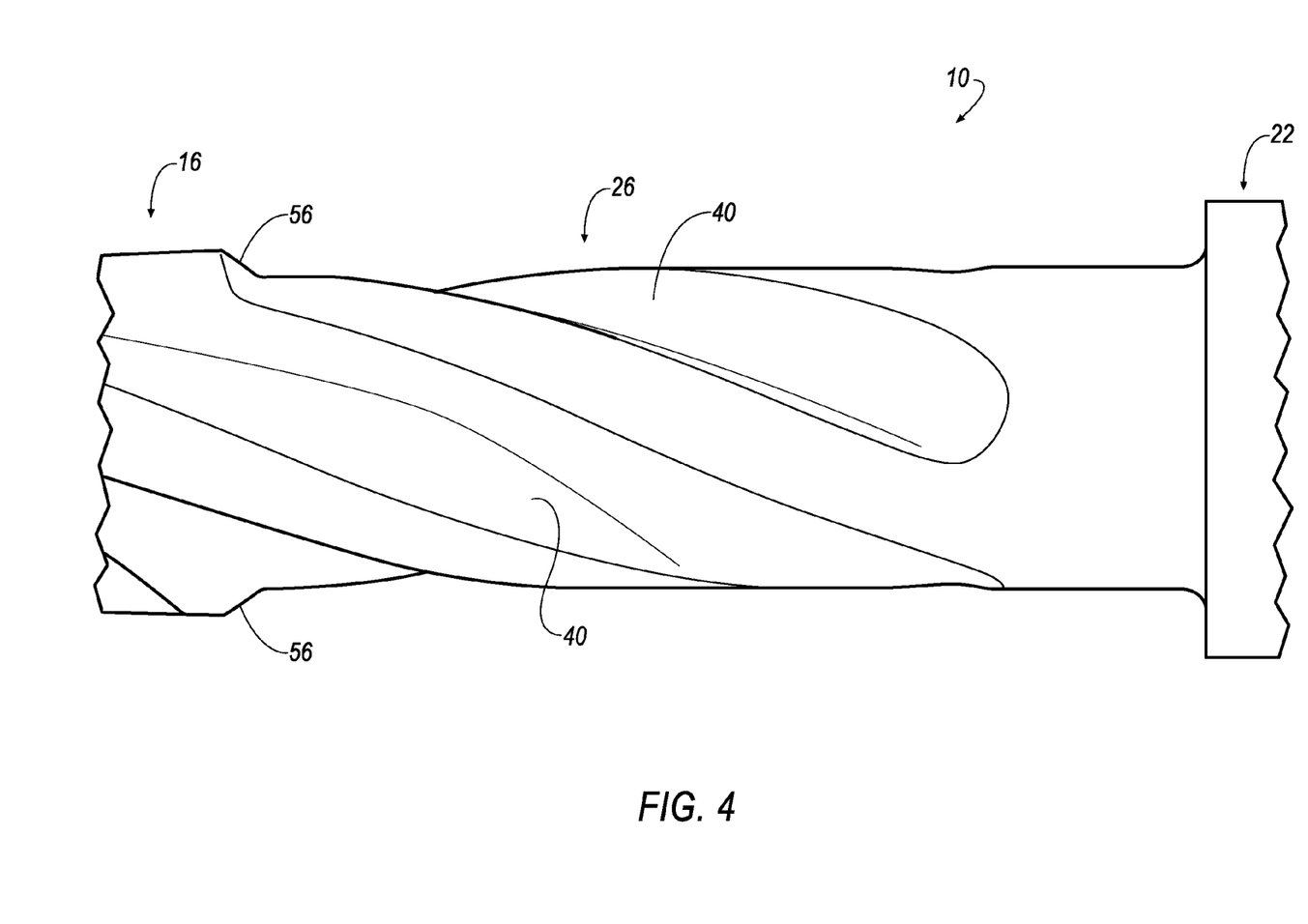
FIG. 4 is an enlarged isometric view of the cutting tool of FIG. 1 showing the rear of the reaming portion with a rear chamfer, and a clearance neck portion.
Figure 5:
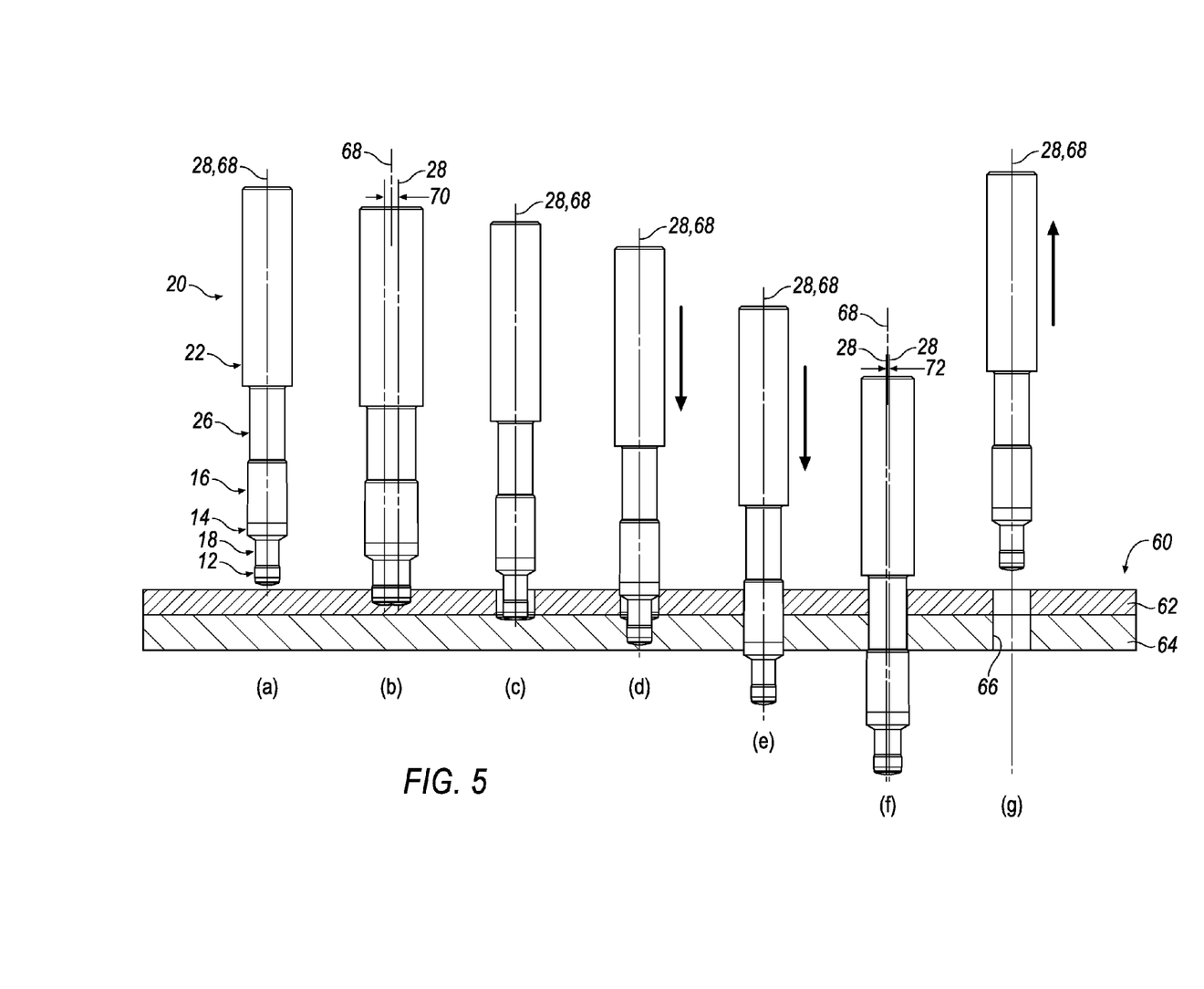

As shown in FIGS. 2-4, the end milling portion 12 and the neck portion 18 include a plurality of spiral cutting flutes 40 forming the cutting edges of the cutting tool 10. The cutting flutes 40 have a C-shaped profile to cause the chips to become trapped inward toward the center of the cutting tool 10. The chips then travel toward the rear of the cutting tool 10 (in the direction of the shank 22) and are disposed out the rear of the cutting tool 10.

In the illustrated embodiment, the end milling portion 12 and the neck portion 18 include four (4) spiral cutting flutes 40 formed at an angle 42 with respect to the longitudinal axis 28 of the cutting tool 10. However, it will appreciated that the invention is not limited by the number of spiral flutes, and that the invention can be practiced with any desirable number of flutes, such as two (2), six (6), eight (8), and the like. In the illustrated embodiment, the angle 42 is approximately thirty (30) degrees.

The angle 42 at which the four flutes 40 are formed changes to a different angle 44 in the rear of the neck portion 18 at a predetermined distance from the end of the cutting tool 10. The purpose of this change in angle is to provide an improved chip flow. In one embodiment, the four flutes 40 change from the angle 42 of about thirty (30) degrees to the angle 44 of about seventeen (17) degrees at a distance 43 of about 0.335 inches (8.51 mm) from the end 20 of the cutting tool 10. However, it will be appreciated that the invention is not limited by the angles 42, 44 of the four flutes 40, and that the invention can be practiced with any desirable angles, depending on the dimensions of the cutting tool, the type of material to be machined, and other design factors. In addition, it will be appreciated that the invention is not limited by the distance from the end of the cutting tool at which angles 42, 44 of the flutes 40 change, and that the invention can be practiced with any desirable distance from the end of the cutting tool 10, depending on the dimensions of the cutting tool 10, and other design factors.

In the drilling portion 14, the total number of cutting flutes 40 changes from four (4) flutes to two (2) cutting flutes 40 and two (2) non-cutting relief flutes 41. The purpose of reducing the number of cutting flutes 40 in the drilling portion 14 is to create a thicker chip for a more realistic drilling operation. In operation, the end milling portion 12 helically interpolates the workpiece 60 (FIG. 3), and then the cutting tool 10 is centered to do the push drilling cycle of the machining operation. Because the four cutting flutes 40 of the end milling portion 12 are relatively small as compared to the two cutting flute 40 of the drilling portion 14, the feed load per cutting flute is small during the push drilling cycle and is too small for a drilling portion with four (4) cutting flutes. By removing two cutting flutes (edges) of the drilling portion 14, the chip load is increased for the remaining two cutting flutes 40, thereby producing a much better chip load for the push drilling cycle of the machining operation.

In addition, the angle of the cutting flutes 40 changes in the drilling portion 14 of the cutting tool 10 at a predetermined diameter of the cutting tool 10. In the illustrated embodiment, the cutting flutes 40 change from the angle 44 of about seventeen (17) degrees to a different angle 46 of about thirty (30) degrees at a diameter 34 of about 0.307 inches (7.80 mm). It is noted that the angle 46 is approximately equal to the angle 42, but the angle 46 can be different than the angle 42. However, it will be appreciated that the invention is not limited at a particular diameter at which the angle of the cutting flutes 40 changes from one angle to a different angle, and that the invention can be practiced at other diameters at which the angles change, depending on the dimensions of the cutting tool 10, and other design factors.

The reaming portion 16 has a different number of cutting flutes 40 than the drilling portion 14 of the cutting tool 10. In the illustrated embodiment, the reaming portion 16 has a total of four (4) cutting flutes 40, which is the same number of cutting flutes 40 as the end milling portion 12 and the neck portion 18 of the cutting tool 10. However, it will be appreciated that the cutting tool 10 can have a different number of cutting flutes 40 in the reaming portion 16 than the end milling portion 12, the drilling portion 14 and/or the neck portion 18 of the cutting tool 10. The purpose of increasing the number of cutting flutes 40 in the reaming portion 16 is to reduce the chip load.

Referring back to FIG. 1, the cutting tool 10 includes a tapered surface 48 between the neck portion 18 and the drilling portion 14. The purpose of the tapered surface 48 is to allow the drilling portion 14 and the reaming portion 16 of the cutting tool 10 to easily enter the metal layer 64 of the workpiece 60 after a pilot hole is drilled in the metal layer 64 by the end milling portion 12. In addition, the tapered surface 48 can be used for removing any burrs from the hole 66 of the workpiece 60 (FIG. 5) in a helical interpolation operation or a circular operation, if necessary. In the illustrated embodiment, the tapered surface 48 is formed at an angle 50 of approximately one hundred eighteen (118) degrees. However, it will be appreciated that the invention is not limited by the angle at which the tapered surface 48 is formed, and that the invention can be practiced with any desirable angle that allows the cutting tool to easily transition between the end milling portion 12 and the drilling portion 14 of the cutting tool 10.

Similarly, the cutting tool 10 includes a tapered surface 52 between the drilling portion 14 and the reaming portion 16. The purpose of the tapered surface 52 is to allow the reaming portion 16 of the cutting tool 10 to easily enter the hole 66 in the workpiece 60 (FIG. 5) at the end of the push drilling operation and the beginning of the reaming operation. In the illustrated embodiment, the tapered surface 52 is formed at an angle 54 of about twenty (20) degrees. However, it will be appreciated that the invention is not limited by the angle at which the tapered surface 52 is formed, and that the invention can be practiced with any desirable angle that allows the cutting tool to easily transition between the drilling portion 14 and the reaming portion 16 of the cutting tool 10.

In addition, the cutting tool 10 includes a tapered surface 56 between the reaming portion 16 and the clearance neck portion 26. In the illustrated embodiment, the tapered surface 56 is formed at an angle 58 of about forty-five (45) degrees. However, it will be appreciated that the invention is not limited by the angle at which the tapered surface 56 is formed, and that the invention can be practiced with any desirable angle that allows the cutting tool to easily transition between the drilling portion 14 and the reaming portion 16 of the cutting tool 10. The purpose of the tapered surface 56 is to prevent dragging of the cutting tool 10 along the inside of the hole 66 in the workpiece 60 (FIG. 5) during the reaming operation. In addition, the tapered surface 56 can be used for removing burrs from the hole 66 in the workpiece 60 in a helical interpolation operation or a circular operation, if necessary. It should be noted that the length of the reaming portion 16 is at least as long as the thickness of workpiece 60 to be machined.

Referring now to FIGS. 5(a)-(f), a method for machining a composite workpiece 60 having a top layer 62 of CFRP material and a bottom layer 64 of metal material will now be described. It will be appreciated that the composite workpiece 60 that is machined by the cutting tool 10 is for illustrative purposes only, and the principles of the invention can be applied to machine workpieces with one or more layers of materials, which may or may not be different have different material properties.

In FIG. 5(a), the cutting tool 10 is positioned at the desired location to begin the machining cycle. At this location, the central, longitudinal axis 28 of the cutting tool 10 is substantially aligned with a central axis 68 of the hole to be drilled.

In FIG. 5(b), the cutter tool 10 uses an orbital drilling cycle (helical interpolation or circular) to begin drilling a hole 66 into the layer 62 of CFRP material. At this point in the machining cycle, the central, longitudinal axis 28 of the cutting tool 10 is moved in a helical or circular direction about the central axis 68 of the hole 66. In other words, the central, longitudinal axis 28 of the cutting tool 10 is moved is a helical or circular motion by a total distance 70 about the central axis 68 of the hole 66. The hole 66 may be full diameter at the entrance only, or be completely finished to full diameter, or may have some finishing stock on the internal diameter (ID) of the hole 66. Note that during this cycle, the removal of the layer 62 of CFRP material is accomplished by using only the end milling portion 12 of the cutting tool 10, and that the drilling portion 14 is not used at all. Thus, there is no wear of the drilling portion 14 of the cutting tool 10 during this cycle.

In FIG. 5(c), the cutting tool 10 is positioned such that the central, longitudinal axis 28 of the cutting tool 10 is substantially aligned with the central axis 68 of the hole 66 (i.e., the cutting tool 10 has zero offset) once the cutting tool 10 has removed the layer 62 of CFRP material. As can be seen, the neck portion 18 provides clearance between the cutting tool 10 and the workpiece 60. At this point, the orbital drilling operation has finished.

In FIG. 5(d), the push drilling operation begins. At this point, the cutting tool 10 is moved in the direction of the arrow (toward the workpiece 60). Note that during the push drilling operation, the end milling portion 12 of the cutting tool 10 is now acting as a pilot drill or "step drill" to drill a pilot hole for the drilling portion 14 and the reaming portion 16 of the cutting tool 10. The flutes 40 have a profile such that the chips are retained and exit towards the clearance neck portion 26 to prevent damage to the layer 62 of CFRP material.

In FIG. 5(e), the drilling portion 14 of the cutting tool 10 has almost drilled through the entire workpiece 60 (i.e., both the layers 62, 64), and the reaming portion 16 is simultaneously reaming the hole 66 to finished diameter as the cutting tool 10 is further moved in the direction of the arrow (toward the workpiece 60).

In FIG. 5(f), the reaming portion 16 of the cutting tool 10 has drilled completely through the workpiece 60 and the push drilling operation is complete. At this point, the tapered surface 56 between the reaming portion 16 and the clearance neck portion 26 can be used in an orbital or circular drilling operation to remove any burrs that may exist in the bottom of the hole 60. In other words, the central, longitudinal axis 28 of the cutting tool 10 is moved in a helical or circular direction about the central axis 68 of the hole 66 to be offset by a total distance 72. Typically, the distance 72 is smaller than the distance 70. It is noted that the clearance neck portion 26 is dimensioned so as to provide adequate clearance between the cutting tool 10 and the workpiece 60 during the orbital drilling operation.

In FIG. 5(g), the cutting tool 10 is positioned such that the central, longitudinal axis 28 of the cutting tool 10 is substantially aligned with the central axis 68 of the hole 66 (i.e., the cutting tool 10 has zero offset). Then, the cutting tool 10 is moved in the direction of the arrow (away from the workpiece 60) until the cutting tool 10 is completely refracted from the workpiece 60. At this point, the machining operation is completed.

As described above, the combination end milling/push drilling cutting tool 10 of the invention offers many distinct advantages when compared to conventional cutting tools. The end milling drilling of the layer 62 of CFRP material with the end milling portion 12 of the cutting tool 10 creates the best hole in the workpiece 60, and the push drilling of the layer 64 of metal material is the best method for that reduces cutting time when cutting metal material. By combining end milling and push drilling operations in one cutting tool 10, there is a synergistic effect of improving hole quality and accuracy in a faster operation cycle time as compared to using separate end milling drilling and push drilling cycles with two different cutting tools. In addition, by cutting the layer 62 of CFRP material prior to push drilling cycle provides the unexpected results of increasing the life of the flutes 40 forming the cutting edges of the drilling portion 14 of the cutting tool 10. Further, the wear of the end milling portion 12 does not affect the final hole size of the layer 64 of metal material. The wear of the end milling portion 12 can be compensated for by adjusting the end milling offset to maintain the desired diameter of the hole in the layer 62 of CFRP material. Finally, any burrs in the workpiece 60 can be easily removed upon exit of the cutting tool 10 from the workpiece 60, if necessary.

The patents and publications referred to herein are hereby incorporated by reference.

Having described presently preferred embodiments the invention may be otherwise embodied within the scope of the appended claims.

What is claimed is:

1. A combination end milling/drilling/reaming cutting tool comprising:
    an end milling portion;
    a reaming portion;
    a drilling portion between the end milling portion and the reaming portion;
    a neck portion between the end milling portion and the drilling portion; and
    a clearance neck portion between the reaming portion and a shank.

2. The combination cutting tool of claim 1, wherein the end milling portion has a first diameter, the drilling portion has a second diameter larger than the first diameter, and the reaming portion has a third diameter that is larger than the second diameter.

3. The combination cutting of claim 1, wherein the neck portion has a diameter smaller than a diameter of the clearance neck portion.

4. The combination cutting tool of claim 1, further comprising a tapered surface between the neck portion and the drilling portion and a tapered surface between the reaming portion and the clearance neck portion.

5. The combination cutting tool of claim 1, further comprising a tapered surface between the drilling portion and the reaming portion.

6. A combination end milling/drilling/reaming cutting tool comprising:
    an end milling portion;
    a reaming portion; and
    a drilling portion between the end milling portion and the reaming portion, wherein the end milling portion, the drilling portion and the reaming portion include a plurality of spiral cutting flutes, and
    wherein the plurality of cutting flutes in the end milling portion are formed at a first angle with respect to a longitudinal axis of the cutting tool, and
    wherein the plurality of cutting flutes in the neck portion are formed at a second angle with respect to the longitudinal axis of the cutting tool at a distance from an end of the cutting tool.

7. The combination cutting tool of claim 6, wherein the plurality of flutes in the drilling portion are formed at a third angle with respect to the longitudinal axis of the cutting tool at a predetermined diameter of the drilling portion.

8. The combination cutting tool of claim 7, wherein the first angle is substantially equal to the third angle.

9. A combination end milling/drilling/reaming cutting tool comprising:
    an end milling portion;
    a drilling portion;
    a reaming portion;
    a neck portion between the end milling portion and the drilling portion;
    a shank; and
    a clearance neck portion between the reaming portion and the shank,
    wherein the end milling portion has a first diameter, the neck portion has a second diameter smaller than the first diameter, the drilling portion has a third diameter that is larger than both the first and second diameters, the reaming portion has a fourth diameter that is larger than the first, second and third diameters, and the clearance neck portion has a fifth diameter that is smaller than the third and fourth diameters and larger than the first and second diameters.

10. The combination cutting tool of claim 9, wherein the end milling portion, the drilling portion and the reaming portion include a plurality of spiral cutting flutes.

11. A method of machining a workpiece using a combination end milling/drilling/reaming cutting tool comprising an end milling portion, a drilling portion, and a reaming portion, the method comprising:
    positioning the cutting tool with respect to the workpiece to begin a machining cycle;
    drilling a hole in a first layer of material with the end milling portion of the cutting tool using an orbital drilling operation;
    positioning the cutting tool such that a longitudinal axis of the cutting tool is substantially aligned with an axis of the hole;
    drilling the hole in a second layer of material with the drilling portion of the cutting tool using a push drilling operation; and
    reaming the hole with the reaming portion of the cutting tool using the push drilling operation.

12. The method of claim 11, further including the step of removing burrs from the hole using a tapered surface using a helical interpolation drilling operation or a circular drilling operation.

* * * * *